United States Patent
Cardarelli et al.

(10) Patent No.: US 7,192,564 B2
(45) Date of Patent: Mar. 20, 2007

(54) METHOD FOR RECYCLING SPENT LITHIUM METAL POLYMER RECHARGEABLE BATTERIES AND RELATED MATERIALS

(75) Inventors: Francois Cardarelli, St-Leonard (CA); Jonathan Dube, Laprairie (CA)

(73) Assignee: Avestor Limited Partnership, Boucherville (CA)

( * ) Notice: Subject to any disclaimer, the term of this patent is extended or adjusted under 35 U.S.C. 154(b) by 518 days.

(21) Appl. No.: 10/129,112

(22) PCT Filed: Sep. 13, 2001

(86) PCT No.: PCT/CA01/01300

§ 371 (c)(1), (2), (4) Date: May 22, 2003

(87) PCT Pub. No.: WO02/23651

PCT Pub. Date: Mar. 21, 2002

(65) Prior Publication Data

US 2004/0028585 A1    Feb. 12, 2004

(30) Foreign Application Priority Data

Sep. 13, 2000 (CA) .................................. 2319285

(51) Int. Cl.
*C01D 15/08* (2006.01)
*C01G 31/00* (2006.01)
*H01M 10/42* (2006.01)

(52) U.S. Cl. .................. 423/62; 423/68; 423/111; 423/179.5; 423/209; 429/49; 75/638; 75/671; 75/690; 75/693

(58) Field of Classification Search .................. 429/49; 423/62, 68, 111, 179.5, 209, 299, 138, 150.1, 423/69, 49; 75/638, 671, 690, 693
See application file for complete search history.

(56) References Cited

U.S. PATENT DOCUMENTS

| | | | |
|---|---|---|---|
| 5,352,270 A | 10/1994 | Shackle | ...................... 75/419 |
| 5,888,463 A | 3/1999 | McLaughlin et al. | ..... 423/179.5 |
| 6,261,712 B1 * | 7/2001 | Hayashi et al. | ............... 429/49 |
| 6,686,086 B1 * | 2/2004 | Martin et al. | ................. 429/49 |
| 2005/0244704 A1 * | 11/2005 | Sloop et al. | ................. 429/49 |

OTHER PUBLICATIONS

Z. Pingwei et al. ; "Hydrometallurgical process for recovery of metal values from spent lithium-ion secondary batteries" HYDROMETTALURGY, vol. 47, No. 2-3, pp. 259-271 1998.

* cited by examiner

*Primary Examiner*—Timothy C. Vanoy
(74) *Attorney, Agent, or Firm*—Osler, Hoskin & Harcourt (57) ABSTRACT

The method relates to a pyrometallurgical and hydrometallurgical process for the recovery and recycling of lithium and vanadium compounds from a material comprising spent rechargeable lithium batteries, particularly lithium metal gel and solid polymer electrolyte rechargeable batteries. The method involves providing a mass of the material, hardening it by cooling at a temperature below room temperature, comminuting the mass of cooled and hardened material, digesting with an acid its ashes obtained by incineration, or its solidified salts obtained by molten salt oxidation, or the comminuted mass itself, to give a mother liquor, extracting vanadium compounds from the mother liquor, separating heavy metals and aluminium therefrom, and precipitating lithium carbonate from the remaining solution.

38 Claims, 3 Drawing Sheets

METHOD FOR RECYCLING SPENT LITHIUM METAL POLYMER RECHARGEABLE BATTERIES AND RELATED MATERIALS

TECHNICAL FIELD

This invention relates to a method for recovering and recycling, by means of a pyrometallurgical and hydrometallurgical process, lithium and vanadium compounds from spent lithium metal solid and gel polymer rechargeable batteries. More particularly, the invention is concerned with the recovery of vanadium and lithium in the form of vanadium pentoxide ($V_2O_5$) and lithium carbonate ($Li_2CO_3$) from lithium metal solid and gel polymer electrolyte batteries, scraps therefrom and products used to produce them.

BACKGROUND ART

Despite the importance of strategic materials used into the fabrication of lithium secondary batteries, only few industrial processes were developed commercially to recycle specifically spent lithium batteries, both primary and secondary. Actually, at present only three major companies have developed commercial recycling processes for the neutralization and/or recovery of valuable by-products from spent lithium batteries and one is always developing at the pilot scale. Today the leading lithium battery recycler in the U.S. is Toxco, Inc. which is based in Anaheim, Calif. Toxco processes lithium batteries at its recovery plant located at Trail, British Columbia, Canada. Toxco operates a cryogenic process that is described in U.S. Pat. Nos. 5,345,033 and 5,888,463 and which is capable of recycling about 500 tonnes per year of spent lithium batteries. A major part of these are high performance batteries used as back-up power sources by the US Army (e.g., torpedoes, missiles). Hence numerous chemicals are recycled together without selective sorting (e.g., $Li/SO_2$, $Li/SOCl_2$, Li-Ion, lithium thermal batteries, and lithium reserve batteries). Essentially, the TOXCO process involves reducing the reactivity by lowering the temperature using cryogenic liquids such as nitrogen or argon. The frozen batteries are then immersed under a large volume of aqueous caustic solution made of sodium hydroxide and sodium carbonate. In this bath, the still frozen battery cases are crushed. Active cell materials, such as lithium, react to release hydrogen and heat. Under these harsh conditions, hydrogen ignites burning all flammable organic solvents. At the end of the process, cobalt and lithium carbonate, and in a lesser extent, paper and plastics, carbon black, and metal scrap are also recovered as secondary by-products. Lithium carbonate is purified by electrodialysis and sold by a subsidiary of Toxco, LithChem International. However the TOXCO process is not specifically appropriate to the recycling of lithium metal solid and gel polymer electrolyte batteries because it focuses on alkaline solutions for dissolution and does not focus on the particular vanadium chemistry.

The second company is BDT Inc. formerly Battery Destruction Technology which is located in Clarence, N.Y. BDT specializes in the destruction of hazardous wastes, particularly spent lithium batteries. The current processing capacity is about 350 tonnes per year of both spent lithium batteries and lithium metallic scrap. The process involved which is described in U.S. Pat. No. 4,647,928 consists in crushing the spent batteries under an alkaline aqueous solution of sodium hydroxide with a swing type hammer mill. The resulting sludge is clarified by sieving through a coarse screen, solid wastes are removed by filtration and recovered for disposal and landfilling, while the alkaline filtrate is pH adjusted and redirected to the mill. Unfortunately, this process which only intended to neutralize hazardous materials does not allow easy separation and recovery of valuable by-products such as lithium and vanadium compounds.

The third company is Sony Electronics Inc. which, in close collaboration with Sumitomo Metal Mining Company, has developed a process specifically devoted to recovering cobalt oxide from its own spent Li-Ion batteries used in electronic devices, such as laptop computers, camcorders, digital cameras, and cellular phones. The process involves the calcination of spent cells and utilizes the cogeneration resulting from burning electrolytes. It is capable of recovering cobalt oxide with a sufficiently high quality to reuse the latter directly in the fabrication of new Li-Ion batteries, and the metallic scrap consists of secondary by-product, such as copper and stainless steel. This technology is well established and recycling of spent lithium-ion cells is today performed in Japan with a current processing capacity of 120–150 tonnes per year. Improvement to this process is currently performed in a pilot plant that is located in the US at Dothan, Ala., with a R&D current capacity of 150 kg per year. However, the Sony-Sumitomo process was specifically intended to recover only cobalt oxide from Lithium-Ion batteries and cannot be applied to the lithium metal solid and gel polymer technology. Finally, several recent processes for the recovery of both cathodic materials and lithium from cell materials used in Li-Ion secondary batteries were also developed but were not implemented industrially. Finally the four following novel processes designed by Canon (U.S. Pat. No. 5,882,811), Kabushiki Kaisha Toshiba (U.S. Pat. No. 6,120,927), Tokyo Shibaura Electric Co. (U.S. Pat. No. 6,261,712), and Merck Patent GmbH (EP 1056146), are all related to reclamation and recycling of lithium ion batteries. In conclusion, none of the above processes are devoted specifically to the treatment of lithium metal gel and solid polymer electrolyte batteries for recovering both lithium and vanadium therefrom.

Lithium metal polymer batteries, designated under the common acronym LMPB, are promising rechargeable power sources especially developed by the Applicant for automotive applications, such as hybrid electric vehicles (HEV), and fully electric vehicle (EV), and the stationary market, such as electric power utilities, telecommunications, etc. The basic electrochemical system of these secondary batteries is made of an anode consisting of an ultra-thin lithium metal foil, a solid copolymer electrolyte containing a lithium salt, a cathode comprising insertion lithium vanadium oxide compounds, and a carbon coated aluminium current collector. Owing to its thin film design, the electrochemical cell (EC) exhibits both high gravimetric (270 Wh/kg) and volumetric energy (415 Wh/kg) densities. An ultimate chemical analysis expressed in mass fraction of a typical electrochemical cell is presented in the following Table 1.

TABLE 1

Ultimate chemical composition of an EC

| Chemical element | Mass fraction |
|---|---|
| Carbon | 28.383 wt % |
| Oxygen | 25.562 wt % |
| Vanadium | 16.612 wt % |

TABLE 1-continued

Ultimate chemical composition of an EC

| Chemical element | Mass fraction |
|---|---|
| Aluminium | 11.049 wt % |
| Lithium | 10.222 wt % |
| Hydrogen | 3.879 wt % |
| Fluorine | 2.540 wt % |
| Sulphur | 1.438 wt % |
| Nitrogen | 0.315 wt % |

However, in view of to their content of strategic cell materials, high energy density, and elevated chemical reactivity, spent lithium metal polymer batteries represent hazardous wastes that could lead to major economical, safety, and environmental issues in the commercialization of large lithium polymer batteries. Therefore, a large commercialization plant must provide for the recycling of these spent batteries in order to neutralize and deactivate these hazardous wastes particularly lithium metal, and lithium vanadium oxide due to their chemical reactivity, toxicity and corrosiveness, thereby ensuring a maximum plant health and safety; it must also recycle all the strategic cell materials in order to recover efficiently and in an economical manner the valuable by-products for decreasing production costs and preserving natural resources from acute depletion. Finally such plant should avoid any release of hazardous materials into the environment in order to fit in zero emission programs, developed by federal and government environmental agencies worldwide.

DISCLOSURE OF INVENTION

In accordance with the present invention there is provided a method of recovering and recycling lithium and vanadium compounds from a material comprising spent lithium metal solid polymer rechargeable batteries, and/or scraps therefrom and/or products used to produce said batteries, which comprises comminuting a hardened and cooled mass of said material under an inert atmosphere, treating the comminuted hardened cooled mass to give a mother liquor containing dissolved vanadium salts and heavy metals, extracting vanadium pentoxide ($V_2O_5$) from the mother liquor separating heavy metals, aluminium and other metallic impurities therefrom, and precipitating lithium carbonate from the remaining solution.

Preferably, the mass of material is comminuted under a flow of liquefied cryogenic gases such as liquid argon, liquid helium and liquid nitrogen.

In accordance with a preferred embodiment, the hardened cooled mass is obtained by hardening the mass of the material by cooling same to a temperature below about 273 K, such as between about 77 K and about 273K, for example 85 K.

In accordance with another preferred embodiment, the method comprises batch incinerating the comminuted hardened cooled mass, and treating the comminuted hardened cooled mass to give the mother liquor. Preferably, the comminuted hardened cooled mass is cooled and the gases produced thereby are scrubbed off before treating the cooled mass to give the mother liquor.

Preferably, the liquor is obtained by digesting ashes and solid residues obtained by batch incinerating the comminuted hardened cooled mass in an acid, such as HF, HCl, HBr, HI, $HNO_3$, $H_3PO_4$, $H_2SO_4$, $HClO_4$, HCOOH, $CF_3SO_3H$, or mixtures thereof. The preferred acid is $H_2SO_4$.

According to another embodiment, the mother liquor is obtained by digesting the comminuted hardened cooled mass directly without prior treatment in an acid such as HF, HCl, HBr, HI, $HNO_3$, $H_3PO_4$, $H_2SO_4$, $HClO_4$, HCOOH, $CF_3SO_3H$, or mixtures thereof, $H_2SO_4$ being preferred, and separating a mixture of inert gas and hydrogen to give the mother liquor.

In accordance with another embodiment, the method comprises heating the comminuted hardened cooled mass under conditions and at a temperature effective to cause oxidation of the comminuted material and removing gases produced during the oxidation, before treating the cooled mass to give the mother liquor. Oxidation may be carried out by oxidizing and/or burning in a molten salt bath comprising a mixture of molten alkali and alkali-earth metals inorganic salts $M_nX_m$ (with M=Li, Na, K, Rb, Cs, Be, Mg, Ca, Sr, Ba and X=$F^-$, $Cl^-$, $Br^-$, $I^-$, $SO_4^{2-}$, $NO_3^-$, $CO_3^{2-}$, $BO_3^{2-}$, $PO_4^{3-}$), the comminuted hardened cooled mass at a temperature effective to cause destruction of the material, for example at a temperature between 500 K and 2000 K, and removing gases produced during the chemical reaction, before treating the cooled mass to give the mother liquor.

In accordance with yet another embodiment, the mother liquor is obtained by digesting the ground solidified salts from which the gases produced during oxidation have been removed, in an acid such as HF, HCl, HBr, HI, $HNO_3$, $H_3PO_4$, $H_2SO_4$, $HClO_4$, HCOOH, $CF_3SO_3H$, or mixtures thereof, $H_2SO_4$ being preferred, the mother liquor containing insoluble solids.

BRIEF DESCRIPTION OF DRAWINGS

The invention is illustrated by but is not limited to the annexed drawing which illustrates preferred embodiments of the invention, and in which.

MODES OF CARRYING OUT THE INVENTION

Figure 1A:
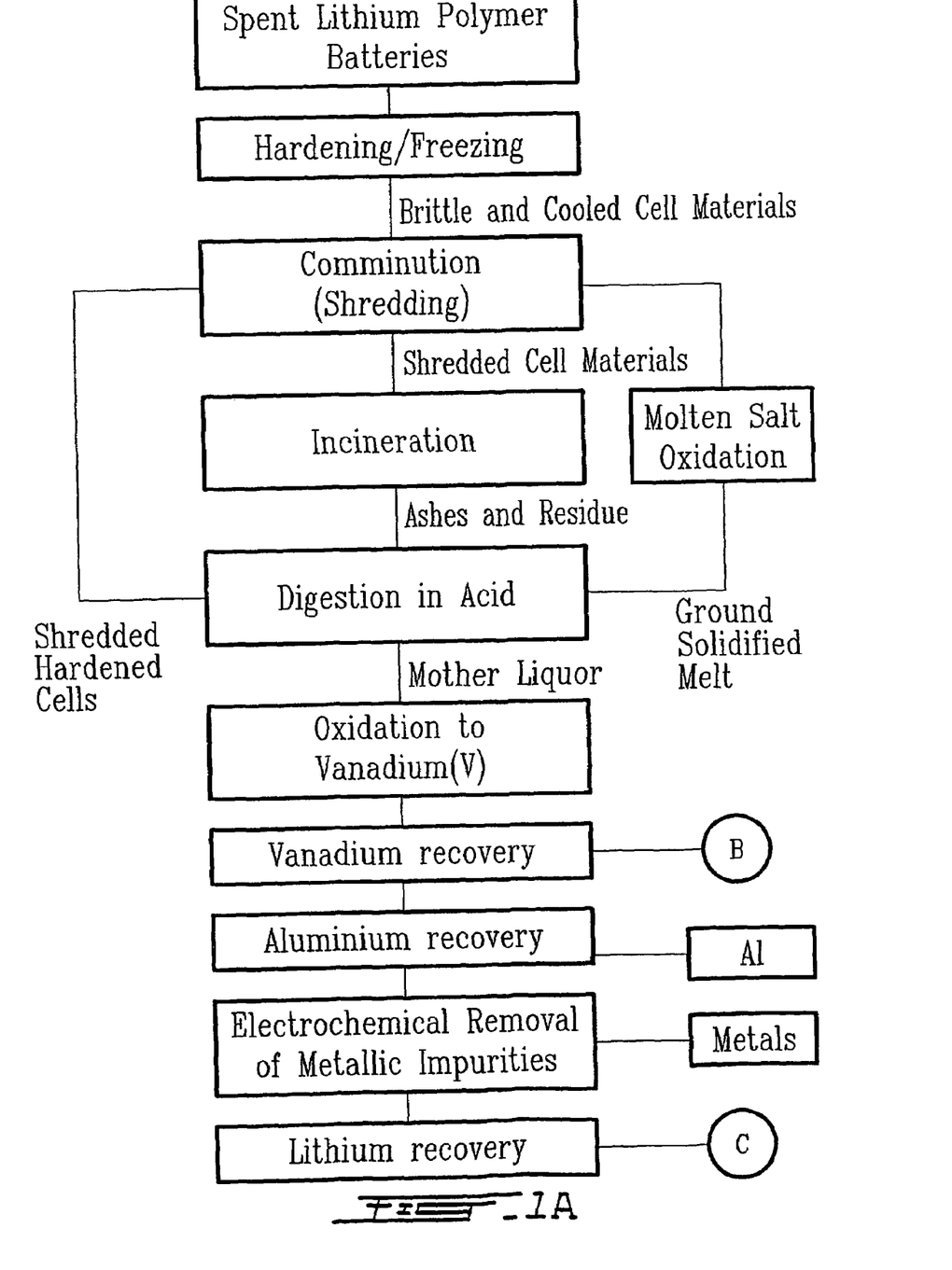
FIGS. 1A, 1B, and 1C are flow sheets representing various steps of the process according to the invention.
Figure 1B:
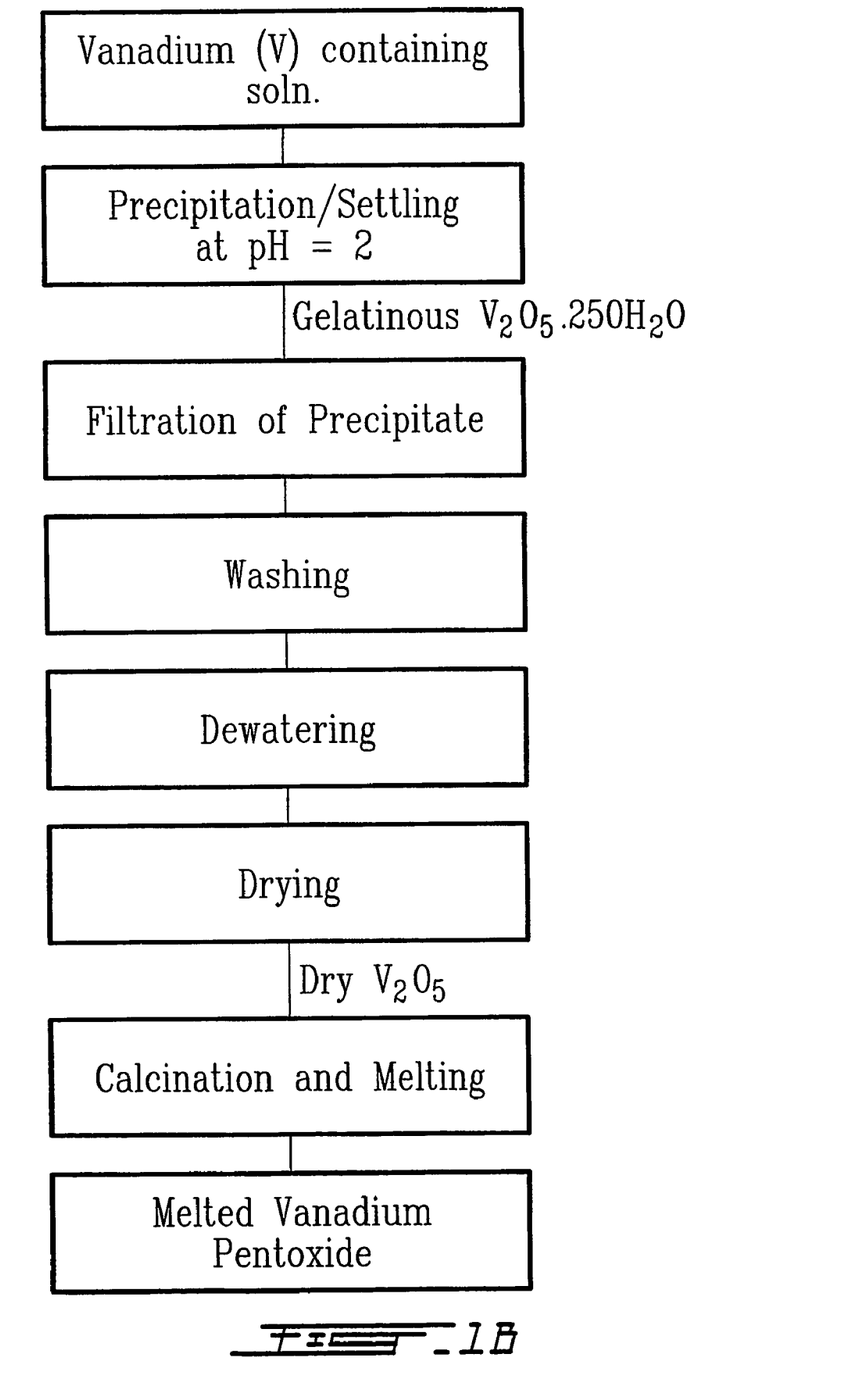
Figure 1C:
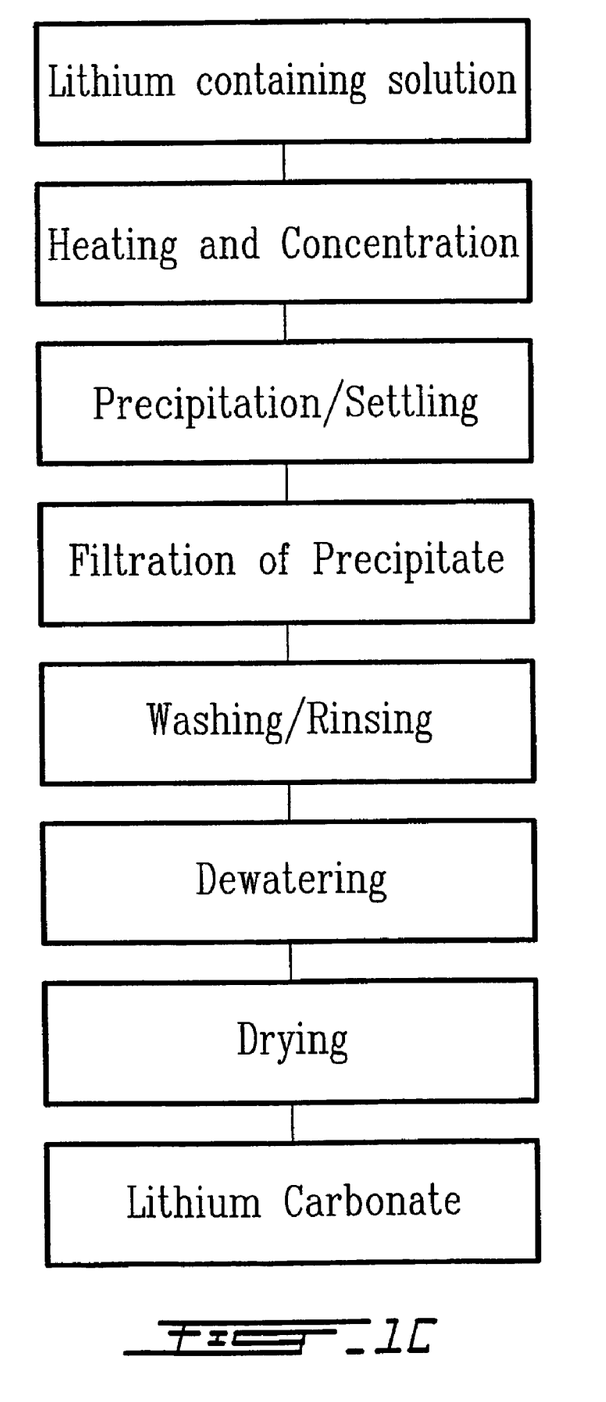

The following description should be read in conjunction with the annexed drawings, which schematically summarize the steps of the various preferred embodiments.

Generally speaking, the invention relates to a method for the recovery and recycling of lithium and vanadium compounds from spent rechargeable lithium batteries, particularly lithium metal gel and solid polymer electrolyte rechargeable batteries, comprising at least one negative electrode active material, a separator, an electrolyte, one positive electrode active material, a current collector and a cell casing. After mechanical dismantling of the casing and providing a mass of cooled and hardened material, the method involves a novel recycling process, consisting of digesting with an acid its ashes obtained by incineration, or its solidified salts obtained by molten salt extraction or the comminuted mass itself to give a mother liquor. The process includes the steps of mechanically dismantling the batteries to remove the metal casing and the electric hardware as scrap, hardening of the soft cell materials by lowering the temperature of the free electrochemical cells (ECs) below ambient temperature, and comminuting the ECs into smaller pieces while in cold state before further processing. The process also includes the further steps of treating the ground cell materials as is or their ashes obtained by incineration, or their solid salts produced after molten salts oxidation (MSO). The ground cell materials, the ashes obtained after incineration, or solidified salts resulting from molten salt oxidation are dissolved into an acid, during which the highly reactive and hazardous spent lithium batteries are first of all reduced to inert materials exhibiting a lower chemical reactivity. Afterwards, the process involves collecting the solid, liquid and gaseous discharges from the reactor, dissolving the solid and liquid discharges with an appropriate solvent and absorbing the gaseous effluents with an alkaline solution, mixing the resultant wash streams, separating precipitates formed from the mixed stream and neutralizing the remaining solution. Finally, the last step consists in recovering efficiently, safely, and in a relatively economical manner the valuable by-products such as vanadium and lithium compounds for reuse in the manufacture of electrochemical cells.

The first step consists in hardening the soft materials such as lithium metal and polymer contained in the mass of spent ECs by cooling preferably below 273 K. The freezing step is necessarily required in order to render the soft materials contained into the electrochemical cell such as metallic lithium and gel or solid polymers more brittle and to facilitate the comminution operation unit and also based on the Arrhenius law for the kinetics rate constant to diminish the chemical reactivity of hazardous cell components during handling.

Due to the fact that active cell materials are tightly encapsulated in a polymeric film, the hardened and frozen ECs must encounter a comminution process in order to release the active materials and enhance their active surface area. In addition, due to the plastic nature of most of the cell materials, cryogenic shredding is the preferred technique among the numerous size reduction processes. For example, the combination of a cryogenic fluid with a rotary cutting mill will harden soft cell materials to render them brittle and easy to grind, and ensure safe operating conditions by maintaining an inert atmosphere around the rotary cutting mill. Cryogenic shredding is normally performed using a cutting mill with sharp knives made of tool steel or hard cemented carbides preferably operating under a continuous flow of liquid argon. The cuttings produced are usually smaller than 1 millimeter. Oversize cuttings are removed by screening under argon and are recycled to the cutting mill. The resulting slurry comprising undersize cuttings and liquid argon, is continuously poured into an incineration vessel. When it is completely full, the reactor is then closed and connected to a compressed air supply for batch incineration of the shredded mass. Then, argon is recovered by evaporation as is well known to those skilled in the art while releasing a mass of cool shredded spent ECs at the bottom of the reactor.

Batch incineration is preferably carried out in a vessel made of bulk heat resistant alloy (e.g., Hastelloy®-X, Inconel®-617). The reaction in the reactor is initiated by heating up the spent mass. After reaching 130° C., usually an exothermic and fast reaction takes place for few seconds with a peak temperature around 1500 K. Afterwards, the combustion or incineration which is conducted, usually takes place at a temperature above about 1000 K during 8 hours. The pressure is about 900 to about 1500 kPa absolute. For incineration, hot air, pure oxygen, or oxygen enriched containing gas, is passed through the reactor and combustion is maintained at sufficiently high temperature (1000 K), with minimum oxygen content in flowing gas until substantially all the carbonaceous materials in the residues are incinerated leaving primarily free metals or metal oxides. It will be noted that the elevated gross or high heating value (HHV) of spent electrochemical cells, ranging from 16 to 23 MJ/kg (determined according to the standard ASTM D240) depending on the type, can be efficiently used to recover heat by cogeneration. During combustion, the off-gases produced leaving the reaction vessel with excess air or oxygen are cooled by means of a heat exchanger and are directed through a dust collector, such as baghouses, high efficiency particulate filters, or an electrostatic separator in order to remove entirely any entrained particulates, such as $Li_2O$, $Al_2O_3$ and $V_2O_5$. Then the dust free gas is directed to a wet scrubber containing a spent slacked lime solution (i.e., $Ca(OH)_2$) for absorbing all the hazardous gaseous effluents, such as $CO_2$, HF, and $SO_2$. These gases react to form a sludge of harmless precipitates made of calcium carbonate ($CaCO_3$), calcium fluoride ($CaF_2$), and calcium sulphate di-hydrate ($CaSO_4.2H_2O$) chemically identical with the three naturally occurring minerals (i.e., calcite, fluorspar, and gypsum) (See Cardarelli, F.—*Materials Handbook. A Concise Desktop Reference.*—Springer Verlag, London, N.Y. (2001), pages 395–478). These solid inorganic compounds can be easily removed by settling and drying, and used as by-products in industrial minerals applications or are ready for safe disposal and landfilling. Finally, the released gases passes through a highly efficient catalytic converter to remove possible residual $NO_x$. The released-gases leaving the catalytic converter is very clean.

After completion of the incineration steps, both the ashes and the remaining solid residues are discharged from the bottom of the incinerator and are introduced with collected dust and particulates into a stirred digestion tank. Digestion is carried out in a glass lined steel vessel or made of any other corrosion resistant materials (e.g., Alloy-20, Alloy 20 Cb, Hastelloy® C-276, zirconium and alloys, niobium or tantalum clad steel). The digestion reaction is initiated by adding hot inorganic or organic acids such as HF, HCl, HBr, HI, $HNO_3$, $H_3PO_4$, $H_2SO_4$, $HClO_4$, HCOOH, $CF_3SO_3H$, or a mixture of them, but sulphuric acid 30 wt % % $H_2SO_4$ is preferred. The dimensionless operating acid ratio (the so-called 'acid number'), i.e., ratio of mass of sulphuric acid to the mass of ashes and solid residues is selected in order to (i) introduce an amount of acid at least equal but preferably greater than the stoichiometric amount required for neutralizing all the cell active materials, and (ii) use the amount of acid required to absorb completely all the heat generated preventing any thermal runaways and maintaining the bath below the maximum temperature allowed in the process. The exothermic reaction wherein lithium sulphate is formed increases temporarily the temperature to 110–120° C. Nevertheless, to maintain a proper operating internal temperature during two hours, internal heating, such as thermowell, heating coil, jacketed walls, or external circulating fluid heating is provided with a tubular or plate heat exchanger. After complete dissolution of soluble by-products containing for example Al, $Al_2O_3$, $Li_2O$, $V_2O_5$ and completion of side reactions (i.e., gas evolution, and heat generation), the solution containing also sludge of insoluble material is pumped with a positive displacement pump and cooled to room temperature. Then, the remaining insoluble solids are removed by hydrocycloning or centrifugation and finally filtration using a filterpress equipment. The filtration cake after washing and drying is landfilled.

The mother liquor and rinsing solutions that contain all the valuable vanadium and lithium are adjusted if necessary to pH below 1 with concentrated sulphuric acid. Afterwards, a small amount of an oxidizing chemical such as chlorine, oxygen, ozone, sulfur dioxide, Caro's acids ($H_2SO_5$ and $H_2S_2O_8$) alkali-metals chlorates $MClO_3$, or permanganates $MMnO_4$ (with M=Li, Na, K), or hydrogen peroxide, is carefully added to the heated solution (80° C.), or also an electrochemical oxidation is performed in order to oxidize entirely all vanadium (IV) and (II) cations to pentavalent vanadium (V) giving at low pH a yellow solution made of vanadyl (V) sulphate $(VO_2)_2SO_4$. Oxidizing salts with lithium cation or hydrogen peroxide are preferred reagents because they do not introduce additional foreign elements and impurities in the solution. Actually these foreign cations or anions could render the ultimate recovery of sufficiently pure chemicals economically unfeasible. Then the liquor is concentrated to obtain a molarity of vanadium (V) above 200 mol.m$^{-3}$. After completion, cooling down the mother liquor to 293 K, a cold solution of lithium hydroxide, LiOH, or also aqueous ammonia 28 wt % $NH_4OH$ is added until reaching pH=2 where flocculation of the hydrated red-brown precipitate of vanadium pentoxide ($V_2O_5.250H_2O$) occurs. The gelatinous precipitate is then separated by settling and filtration, it is carefully washed, dewatered, and dried at 200° C. In order to recover $V_2O_5$, the calcinate must be fired above the melting point of $V_2O_5$. The cooled black molten mass of pure $V_2O_5$ is then crushed and ground in a ball mill to produce a fine powder passing a 200 Tyler mesh sieve. The oversize particles are recycled to the mill.

The previous filtrate is mixed with washing solutions and adjusted to pH=2 by adding conc. $H_2SO_4$. The traces of heavy metals coming from solder, wiring (i.e., $Cu^{2+}$, $Pb^{2+}$, $Sn^{2+}$) are removed by common cathodic electrodeposition onto a steel, nickel, copper, or zirconium cathode under galvanostatic conditions with a constant cathodic current density of 200 A.m$^{-2}$ and using an efficient dimensionally stable anode for evolving oxygen in acidic media (i.e., DSA®-$O_2$) such as Ti/$IrO_2$, but preferably Nb/$IrO_2$ or Ta/$IrO_2$ (See Cardarelli, F.—*Materials Handbook. A Concise Desktop Reference.*—Springer Verlag, London, N.Y. (2001), pages 328–331). Other methods can also include a separation using solvent extraction or ion exchange resins techniques.

The purified solution obtained after removal of heavy metals is mixed with washing solutions and concentrated by evaporation. Then, after cooling down the mother liquor to 20° C., a cold solution of lithium hydroxide, LiOH, or an aqueous ammonia 28 wt % $NH_4OH$ is added until reaching pH about 5 where flocculation of the gelatinous aluminium hydroxide ($Al(OH)_3$) occurs. The precipitate is then separated by settling and filtration. The carefully washed, dewatered, dried precipitate is then calcinated and ready for use or disposal.

The purified lithium sulphate liquor obtained after extracting aluminium therefrom is mixed with washing solutions, concentrated by evaporation up to 650 kg.m$^{-3}$ $Li_2SO_4$, adjusted to pH about 8 by adding lithium hydroxide (LiOH), and warmed up to 100° C. Then carbon dioxide, $CO_2$ is bubbled, or ammonium carbonate $(NH_4)_2CO_3$ is added to precipitate lithium carbonate $Li_2CO_3$ which is separated by filtration. The precipitate is washed and dried. The remaining liquor containing ammonium sulphate is stored for disposal.

As an alternative embodiment, instead of pouring the slurry obtained by shredding with a rotary cutting mill in an incineration vessel it is continuously poured into a digestion reaction vessel made of glass lined steel or made of any other corrosion resistant materials (e.g., Alloy-20, Alloy 20Cb, Hastelloy® C-276, zirconium and alloys, niobium or tantalum clad steel). The reactor is then closed and argon is recovered by evaporation while releasing a mass of cool shredded ECs at the bottom of the reactor.

The digestion reaction is initiated by adding hot inorganic or organic acids such as HF, HCl, HBr, HI, $HNO_3$, $H_3PO_4$, $H_2SO_4$, $HClO_4$, HCOOH, $CF_3SO_3H$, or a mixture of them, but sulphuric acid 30 wt % $H_2SO_4$ at 80° C. is preferred. The dimensionless operating acid ratio (the so-called 'acid number'), i.e., ratio of mass of sulphuric acid to the mass of spent ECs is selected in order to: (i) introduce an amount of acid at least equal but preferably greater than the stoichiometric amount required for neutralizing all the cell active materials, and (ii) use the amount of acid required to absorb completely all the heat generated preventing any thermal runaways and maintaining the bath below the maximum temperature allowed in the process. The exothermic reaction wherein lithium sulphate is formed increases temporarily the temperature to 110–120° C. Nevertheless, to maintain a proper operating internal temperature during one hour, internal heating, such as thermowell, heating coil, jacketed walls, or external circulating fluid heating is provided, such as a tubular or plate heat exchanger are required. After complete dissolution of soluble by-products containing for example Al, $Al_2O_3$, $Li_2O$, $V_2O_5$ and completion of side reactions (i.e., hydrogen gas evolution, and heat generation), the solution also containing sludge of insoluble material is pumped with a positive displacement pump such as a diaphragm, a Moyno® or Delasco pump and cooled to room temperature. Then, the remaining insoluble solids are removed by hydro-cycloning or centrifugation and finally filtration using a filterpress equipment. The filtration cake after washing and drying is landfilled.

Extraction of vanadium, removal of heavy metals, and aluminium and lithium extraction are carried out in the same manner as in the first embodiment.

In the third embodiment, instead of batch incinerating the shredded mass, the latter is subject to batch oxidation performed in a molten salt bath.

Batch molten salt oxidation (MSO) is employed and performed in a reaction vessel made of corrosion and heat resistant alloy (e.g., Hastelloy®-X, Inconel®-617, nickel or copper clad steel, titanium and alloys, zirconium and alloys). The reaction is initiated by injecting the spent shredded mass into a molten salt bath comprising a mixture of molten alkali and alkali-earth metals inorganic salts $M_nX_m$ (with M=Li, Na, K, Rb, Cs, Be, Mg, Ca, Sr, Ba and X=$F^-$, $Cl^-$, $Br^-$, $I^-$, $SO_4^{2-}$, $NO_3^-$, $CO_3^{2-}$, $BO_3^{2-}$, $PO_4^{3-}$) at temperatures between 500 K–2000 K, preferably 1000 K. Usually an exothermic and fast reaction takes place for few seconds with a peak temperature around 1500K. Afterwards, the temperature is maintained constant at 1000K during 8 hours. It will be noted that the elevated gross or high heating values (HHV) of spent ECs ranging from 16 to 23 MJ/kg depending on type can be efficiently used to recover heat by cogeneration. During oxidation, the acid gases generated such as HF, $CO_2$, and $SO_2$, are scrubbed from waste and captured in the melt as fluoride, carbonate, and sulphate salts. Other off-gases leaving the reaction vessel, such as CO, $NO_x$ are cooled by means of a heat exchanger and directed through a dust collector, such as baghouses, high efficiency particulate filter, or electrostatic separator, in order to remove entirely any entrained particulates. Then the dusted off-gases are directed to a wet scrubber. Finally, the off-gases pass through a catalytic converter. The off-gases leaving the catalytic converter is very clean.

After completion of each molten oxidation steps, the bath is cooled down and solidified. The solid salt mass is then crushed inside the reactor by means of a jack hammer, and the resulting blocks are further ground in a gyratory crusher followed by ball milling. The powdered salty mass is introduced with collected dust and particulates into a stirred digestion tank. Digestion is carried out in a glass lined steel vessel or a vessel made of any other corrosion resistant materials (e.g., Alloy-20, Alloy 20 Cb, Hastelloy® C-276, titanium and alloys, zirconium and alloys, niobium or tantalum clad steel). The digestion reaction is initiated by adding hot inorganic or organic acids such as HF, HCl, HBr, HI, $HNO_3$, $H_3PO_4$, $H_2SO_4$, $HClO_4$, HCOOH, $CF_3SO_3H$, or a mixture thereof, but sulphuric acid 30 wt % $H_2SO_4$ at 80° C. is preferred. In order, to maintain a proper operating internal temperature during one hour, internal heating, such as thermowell, heating coil, jacketed walls, or external circulating fluid heating is provided with a tubular or plate heat exchanger. After complete dissolution of soluble by-products containing for example Al, $Al_2O_3$, $Li_2O$, $V_2O_5$ and completion of side reactions (i.e., gas evolution, and heat generation), the solution also containing sludge of insoluble material is pumped with a positive displacement pump such as Moyno® or Delasco pump and cooled to room temperature. Then, the remaining insoluble solids are removed by hydrocycloning or centrifugation and finally filtration using a filterpress equipment. The filtration cake after washing and drying are landfilled.

Extraction of vanadium, removal of heavy metals and extraction of aluminium and lithium are carried out similarly as in the first embodiment.

EXAMPLES

The invention will now be illustrated by the following non-limiting examples.

Example 1

Incineration of ECs and Digestion of Ashes

The first step consisted in rendering more brittle and easy to comminute a mass of one kilogram of spent electrochemical cells (ECs) having the chemical composition listed in Table 1. The electrochemical cells exhibited various states of charge. Hardening occurred by immersing the spent ECs directly into liquid argon maintained at 85 K. The dimensionless ratio, denoted $r_{AE}$, is the mass of liquid argon required per unit mass of ECs and it was calculated by the following equation listed below:

$$r_{AE} = \frac{m_{Ar}}{m_{EC}} = \frac{c_{PEC} \cdot (T_{EC} - T_F)}{c_{PAr} \cdot (T_F - T_{Ar})}$$

where $m_{Ar}$ and $m_{EC}$ are the masses expressed in kg of liquid argon and spent ECs respectively, $c_{PAr}$ and $c_{PEC}$ are the specific heat capacities expressed in $J.kg^{-1}.K^{-1}$ of liquid argon and spent ECs respectively, and $T_{Ar}$, $T_{EC}$, and $T_F$ are temperatures expressed in kelvin of liquid argon, spent ECs, and the final temperature allowed after immersion respectively. Using liquid argon at 85K and based on the following experimental parameters: (i) an average temperature $T_E$ around 260K of spent ECs which are stored in refrigerated warehouses, (ii) the specific heat capacities of liquid argon $c_{PAr}$ of 1058 $J.kg^{-1}.K^{-1}$ (Perry, R. H., and Green, D. W.—*Perry's Chemical Engineers' Handbook* $7^{th}$ ed.—McGraw-Hill, New York (1997) page 2–217) and $c_{PEC}$ of spent ECs of 1619 $J.kg^{-1}.K^{-1}$, and (iii) the final allowed temperature of the solid-liquid mixture maintained slightly below the boiling point of argon (87.65K) at 87 K, the practical ratio selected was about 134. That is 134 kg of liquid argon (ca. 95 $dm^3$) were used for 1 kg of ECs. In addition, owing to the lower density of spent ECs (1369 $kg.m^{-3}$) than the density of liquid argon at 85K (1407 $kg.m^{-3}$), the light spent ECs were introduced into the liquid argon using either a metallic screen basket or an expanded or a perforated metal box containing the said cell materials in order to prevent hazardous floatation at the liquid-gas interface. Due to the issue of ductile-to-brittle transition at low temperature, face centered cubic (fcc) metals and alloys such as aluminium alloy 6061-T6 and austenitic stainless steel grade AISI 316L were preferred and selected for designing components and vessels. The residence time in the Dewar flask was about 30 minutes. Then more brittle, the hardened mass was directed to a shredder having knives blades made of tungsten carbide (Pulverisette 25, Fritsch GmbH). During the comminution operation, a continuous flow of liquid argon at 85 K circulates by gravity inside the shredding chamber maintaining sufficient hardness of the cell materials, and providing by evaporation an inert medium around the delaminated sheets. The final specific surface area of shredded cell materials forming delaminated pieces was measured equal to 1.5 $m^2.kg^{-1}$ compared to the initial value of 0.3 $m^2.kg^{-1}$ with expected benefits for the reaction kinetics. The cuttings produced were smaller than about one millimeter. Oversize cuttings were removed with a stainless steel 316L wet vibrating screen with aperture of 12 Tyler meshes operated under a flow of liquid argon and directed to the cutting mill operation. Mass yield during comminution was about 98 wt %. The resulting cooled slurry (i.e., undersize delaminated cuttings and liquid argon) was directly collected with a perforated ladle and poured into a tubular incinerator. The tubular incinerator vessel had both walls and bottom of 2.54 cm thickness, a total length of 0.9144 m, an outside diameter of 30.48 cm with an actual capacity of about 45 $dm^3$. The incinerator was made of annealed Inconel®-617. The incinerator was safely designed according to the *ASME Boiler and Pressure Vessels code* in order to withstand the maximum pressure rise in the worst case of thermal runaway related to sudden decomposition reaction of one kg ECs without proper venting. When completely loaded, the reactor and its cover flange were tightly bolted together using a pure annealed gold-platted copper O-ring and connected to an air compressor at 1.5 bars absolute pressure. Then, liquid and gaseous argon were gently removed by displacement while releasing a mass of cool shredded spent ECs inside the reactor. The reaction in the incinerator was initiated by heating up the incinerator retort into an electric heating oven made with a Fibrothal® module with Kanthal® Al heating elements. A flow of 20 (STP)$dm^3$/min compressed dry air was maintained until completion of the reaction in order to facilitate total combustion of all the carbonaceous materials (e.g., carbon black and copolymer). Two thermocouples B-type recorded both the inside and outer reactor surface temperature. After reaching 130° C., usually an exothermic and fast reaction occurs for few seconds with a peak temperature around 1500 K. Afterwards, the external heating was maintained constant at a temperature of about 1000 K during 8 hours. During combustion, the off-gases produced leaving the reaction vessel were collected and cooled by means of a miniature shell and tube heat exchanger made of stainless steel grade AISI 316L (Exergy Inc.) and were directed through a high efficiency particulate filter in order to remove entirely any entrained particulates (i.e., $Li_2O$, $Al_2O_3$, $V_2O_5$). Then the dust free gas is directed to a wet scrubber containing a spent slacked lime solution ($Ca(OH)_2$) for absorbing all the hazardous gaseous effluents (i.e., $CO_2$, HF, and $SO_2$). These gases reacted to form a sludge of harmless precipitates made of calcium carbonate ($CaCO_3$), calcium fluoride ($CaF_2$), and calcium sulphate ($CaSO_4$). The solid compounds were removed by settling and dried. Finally, the released gas passed through a small catalytic converter. After completion of the incineration steps, the 711 grams of both ashes and solid residues having the ultimate chemical composition presented in Table 2 were discharged from the incinerator and introduced with collected dust and particulates into the stirred digestion reactor.

TABLE 2

Chemical analysis of ashes from incinerated cells

| Chemical element | Mass fraction |
|---|---|
| Vanadium pentaoxide ($V_2O_5$) | 40.88 wt % |
| Aluminium sesquioxide ($Al_2O_3$) | 30.33 wt % |
| Lithium oxide ($Li_2O$) | 28.79 wt % |

The digestion reactor was made of a small jacketed glass-lined steel vessel with a capacity of 37.85 $dm^3$ (LBO series from Tycon®) and a large bottom discharge. The digestion reaction was initiated by adding a solution of sulphuric acid at ambient temperature, after which it was heated to 80° C. The dimensionless physical quantity called the operating acid ratio, denoted $R_O$, i.e., the mass of acid to the mass of both ashes and solid residues that can be currently used without having thermal runaway issues but sufficient to neutralize all the cell active materials is determined taking the greater value of both the neutralization and the safety acid ratio as listed below.

$$R_O = \max(R_N, R_S)$$

The dimensionless quantity called the neutralization acid ratio, denoted $R_N$, i.e., the mass of acid required to neutralize stoichiometrically all active cell materials to the mass of both ashes and solid residues was calculated using the following theoretical equation:

$$R_N = \frac{m_{acid}}{m_{ashes}} = \frac{MM_{H2SO4}}{x_{acid}} \cdot \left[ \frac{x_{Li2O}}{MM_{Li2O}} + \frac{x_{V2O5}}{MM_{V2O5}} + \frac{3 \cdot x_{Al2O3}}{MM_{Al2O3}} \right]$$

where $x_{Li2O}$, $x_{V2O5}$, and $x_{Al2O3}$ are the dimensionless mass fractions of lithium oxide, vanadium pentaoxide, and aluminium oxide present in the ashes and solid residues; where $MM_{H2SO4}$, $MM_{Li2O}$, $MM_{V2O5}$, and $MM_{Al2O3}$ are the molecular molar masses expressed in $kg.mol^{-1}$ of sulphuric acid, lithium oxide, vanadium pentaoxide, and aluminium oxide, and $x_{acid}$ is the sulphuric concentration expressed in mass fractions. This neutralization acid ratio is based on the three following chemical reactions schemes:

$Li_2O+H_2SO_4=Li_2SO_4+H_2O$  $\Delta h=-10386$ $kJ.kg^{-1}$ of $Li_2O$ $V_2O_5+H_2SO_4=(VO_2)_2SO_4+H_2O$  $\Delta h=-1715$ $kJ.kg^{-1}$ of $V_2O_5$ $Al_2O_3+3H_2SO_4=Al_2(SO_4)_3+3H_2O$  $\Delta h=-719$ $kJ.kg^{-1}$ $Al_2O_3$ However, for safety reasons especially for preventing thermal runaways, another dimensionless physical quantity must be introduced and calculated, it is the safety acid ratio, denoted $R_S$. It describes the ratio of the mass of acid that can absorb all the heat generated by the exothermic reaction wherein vanadyl, aluminium and lithium sulphates are formed without reaching the maximum allowed temperature to the mass of ashes and solid residues. The safety acid ratio can be calculated using the following equation:

$$Rs = \frac{m_{acid}}{m_{ashes}} = \frac{[\Delta h_{reaction} - c_{Pashes}(T_{\max} - T_{ashes})]}{c_{Paicd}(T_{\max} - T_{acid})}$$

with $c_{Pacid} = x_{water} \cdot c_{pwater} + x_{H2SO4} \cdot c_{PH2SO4}$ where $m_{acid}$ and $m_{ashes}$ are the masses expressed in kg of acid and ashes respectively, $\Delta h_{reaction}$, the specific enthalpy of the dissolution reaction in $J.kg^{-1}$, $c_{PH2SO4}$, $c_{Pacid}$, $c_{Pwater}$ and $c_{Pashes}$ are the specific heat capacities expressed in $J.kg^{-1}.K^{-1}$ of concentrated sulphuric acid, the sulphuric acid aqueous solution, water, and ashes respectively, and $T_{acid}$, $T_{ashes}$, and $T_{max}$ are temperatures expressed in kelvin of the acid, the ashes, and the maximum temperature allowed in the process. For instance, values of neutralization and safety acid ratios are listed for several sulfuric acid concentrations in Table 3 based on the chemical composition of the ashes listed in Table 2.

TABLE 3

Neutralization, safety and operating acid ratios for ashes with several acid concentrations

| | Concentrated sulphuric acid (98 wt %. $H_2SO_4$) | Battery grade sulphuric acid (30 wt %. $H_2SO_4$) | Diluted sulphuric acid (20 wt %. $H_2SO_4$) |
|---|---|---|---|
| Neutralization acid ratio ($R_N$) | 2.09 | 6.82 | 10.23 |
| Safety acid ratio ($R_S$) | 19.71 | 8.65 | 7.99 |
| Operating acid ratio ($R_O$) | 20.00 | 10.00 | 15.00 |

Therefore, for safety and economical concerns a sulphuric acid concentration of 30 wt %. $H_2SO_4$ was selected with an operating acid ratio of about 10, that is 7.11 kg of acid (ca. 6 $dm^3$) in our case. After completion of the exothermic dissolution, the operating temperature was maintained at 80° C. during 2 hours by heating the jacket. Mixing was obtained with a PTFE-coated impeller (IKA). After complete dissolution of solids (i.e., $Al_2O_3$, $Li_2O$, $V_2O_5$) and completion of side reactions (i.e., gas evolution, and heat generation), the bath acidity was adjusted to pH below 1 by adding concentrated sulphuric acid 98 wt %. Afterwards, about 50 grams of lithium chlorate, $LiClO_3$ or concentrated hydrogen peroxide $H_2O_2$ 30% vol. was carefully added to the heated solution (80° C.) in order to oxidize all vanadium (IV) and (III) cations to pentavalent vanadium (V) species. Practically, the addition of the oxidizing chemical continues until the deep blue solution is totally converted to a yellow solution containing all vanadium as vanadyl (V) sulphate $(VO_2)_2SO_4$. Then the liquor is concentrated by evaporation to a molarity of vanadium (V) above 200 $mol.m^{-3}$ concentration which was determined by UV-Vis spectrophotometry. Once digestion and oxidation completed the solution was bottom pumped into a tank with a positive displacement pump such as PTFE diaphragm pump (George Fisher) and allowed to cool to ambient temperature. Then, the few remaining insoluble solids were removed by hydrocycloning or centrifugation and finally filtration using a filterpress equipment. Afterwards, lithium hydroxide solution or aqueous ammonia 28 wt % $NH_4OH$ was added until reaching pH=2 where flocculation of the hydrated red-brown precipitate of vanadium pentoxide ($V_2O_5 \cdot 250H_2O$) occurs. The gelatinous precipitate was separated by settling and filtration, carefully washed, dewatered, and dried at 200° C. In order to recover $V_2O_5$, the calcinate was fired at 700° C. during 2 hours in an Inconel®-617 crucible. The cooled black molten mass of pure $V_2O_5$ was then crushed and ground in a pebble mill with yttria stabilized zirconia balls of 10 mm to produce a fine red powder which passes a 200 Tyler mesh sieve. The final mass was 293 g with a purity of 98.5 wt %. $V_2O_5$. The oversize particles were recycled to the pebble mill. The previous filtrate was mixed with washing solutions and adjusted to pH about 2 by adding concentrated acid at 98 wt %. $H_2SO_4$. The traces of heavy metals (i.e., $Cu^{2+}$, $Pb^{2+}$ $Sn^{2+}$) were removed by common cathodic electrodeposition achieved onto a zirconium cathode under galvanostatic conditions with a constant cathodic current density of 200 $A.m^{-2}$ and using an expanded dimensionally stable anode for evolving oxygen in acidic media (i.e., DSA®-$O_2$) such as Ta/$IrO_2$ (30 $g/m^2$ $IrO_2$) (Magnetochemie B. V.). The electrolyzed solution was mixed with washing solutions and concentrated by evaporation in a kettle. Then, after cooling down the mother liquor to 20° C., lithium hydroxide solution or aqueous ammonia 28 wt % $NH_4OH$ was added until reaching pH about 5 where flocculation of the gelatinous aluminium hydroxide ($Al(OH)_3$) occurred. The precipitate was then separated by settling and filtration. The washed, dewatered, dried precipitate was calcinated into a muffle furnace (Carbolite). The 205 grams obtained exhibited a purity of 98 wt %. The purified lithium sulphate liquor was mixed with washing solutions, concentrated by evaporation up to 650 $kg/m^3$ $Li_2SO_4$ measured by flame spectrophotometry and adjusted to pH about 8 by adding lithium hydroxide (LiOH), and warmed up to 100° C. Then by bubbling carbon dioxide or adding ammonium carbonate $(NH_4)_2CO_3$, lithium carbonate $Li_2CO_3$ precipitated and was separated by filtration. The precipitate was washed and dried. The 520 grams of $Li_2CO_3$ obtained exhibited a purity of 98 wt %. The remaining liquor containing ammonium sulphate was discarded.

Example 2

Direct Digestion of ECs

The first step consisted in rendering more brittle and easy to comminute a mass of one kilogram of spent electrochemical cells (ECs) having the chemical composition listed in Table 1. The electrochemical cells exhibited various states of charge. The hardening occurred by immersing the spent ECs directly into liquid argon maintained at 85 K. The dimensionless ratio, denoted $r_{AE}$, is the mass of liquid argon required per unit mass of ECs and it was calculated by the following equation listed below:

$$r_{AE} = \frac{m_{Ar}}{m_{EC}} = \frac{c_{PEC} \cdot (T_{EC} - T_F)}{c_{PAr} \cdot (T_F - T_{Ar})}$$

Where $m_{Ar}$ and $m_{EC}$ are the masses expressed in kg of liquid argon and spent ECs respectively, $c_{PAr}$ and $c_{PEC}$ are the specific heat capacities expressed in $J.kg^{-1}.K^{-1}$ of liquid argon and spent ECs respectively, and $T_{Ar}$, $T_{EC}$, and $T_F$ are temperatures expressed in kelvin of liquid argon, spent ECs, and the final temperature allowed after immersion respectively. Using liquid argon at 85K and based on the following experimental parameters: (i) an average temperature $T_E$ around 260K of spent ECs which are stored in refrigerated warehouses, (ii) the specific heat capacities of liquid argon $c_{PAr}$ of 1058 $J.kg^{-1}.K^{-1}$ (Perry, R. H., and Green, D. W.—Perry's Chemical Engineers' Handbook 7$^{th}$ ed.—McGraw-Hill, New York (1997) page 2–217) and $c_{PEC}$ of spent ECs of 1619 $J.kg^{-1}.K^{-1}$, and (iii) the final allowed temperature of the solid-liquid mixture maintained slightly below the boiling point of argon (87.65K) at 87 K, the practical ratio selected was about 134. That is 134 kg of liquid argon (ca. 95 $dm^3$) were used for 1 kg of ECs. In addition, owing to the lower density of spent ECs (1369 $kg.m^{-3}$) than the density of liquid argon at 85K (1407 $kg.m^{-3}$), the light spent ECs were introduced into the liquid argon using either a metallic screen basket or an expanded or a perforated metal box containing the said cell materials in order to prevent the hazardous flotation at the liquid-gas interface. Due to the issue of ductile-to-brittle transition at low temperature, face centered cubic (fcc) metals and alloys such as aluminium alloy 6061-T6 and austenitic stainless steel grade AISI 316L were preferred and selected for designing components and vessels. The residence time in the Dewar flask was about 30 minutes. Then more brittle, the hardened mass was directed to a shredder having knives blades made of tungsten carbide (Pulverisette 25, Fritsch GmbH). During the comminution operation, a continuous flow of liquid argon at 85 K circulates by gravity inside the shredding chamber maintaining sufficient hardness of the cell materials, and providing by evaporation an inert medium around the delaminated sheets. The final specific surface area of shredded cell materials forming delaminated pieces was measured equal to 1.5 $m^2.kg^{-1}$ compared to the initial value of 0.3 $m^2.kg^{-1}$ with expected benefits for the reaction kinetics. The cuttings produced were smaller than about one millimeter. Oversize cuttings were removed with a stainless steel 316L wet vibrating screen with aperture of 12 Tyler meshes operated under a flow of liquid argon and directed to the cutting mill operation. Mass yield during comminution was about 98 wt %. The resulting cooled slurry (i.e., undersize delaminated cuttings and liquid argon) was directly collected with a perforated ladle and poured into the digestion reactor.

The digestion reactor was made of a small jacketed glass-lined steel vessel with a capacity of 37.85 $dm^3$ (LBO series from Tycon®) with a large bottom discharge. The digestion reaction was initiated by adding a solution of sulphuric acid at ambient temperature then heated to 80° C. In order to prevent the hazardous flotation of lithium metal at the surface of the bath which can cause severe explosion of the hydrogen evolved, the spent ECs was maintained at the bottom of the reactor using an immersed and fine expanded metallic screen made of Hastelloys® C-276. The dimensionless quantity called the operating acid ratio, denoted $R_O$, i.e., the mass of acid to the mass of spent ECs that can be currently used without having thermal runaway issues but sufficient to neutralize all the cell active materials is determined taking the greater value of both the neutralization and the safety acid ratio as listed below.

$$R_O = \max(R_N, R_S)$$

The dimensionless quantity called the neutralization acid ratio, denoted $R_N$, i.e., the mass of acid required to neutralize stoichiometrically all active cell materials to the mass of spent ECs was calculated using the following theoretical equation:

Where $x_{Li}$, $x_{V2O5}$, and $x_{Al}$ are the dimensionless mass fractions of the lithium metal, vanadium pentaoxide, and aluminium metal present in the spent ECs. Where $MM_{H2SO4}$, $MM_{Li}$, $MM_{V2O5}$, and $MM_{Al}$ are the atomic and molecular molar masses expressed in kg.mol$^{-1}$ of sulphuric acid, lithium metal, vanadium pentaoxide, and aluminium metal, and $x_{acid}$ is the sulphuric concentration expressed in mass fractions. This neutralization acid ratio is based on the three following chemical reactions schemes:

2Li+H$_2$SO$_4$=Li$_2$SO$_4$+H$_2$ Δh=−44835 kJ.kg$^{-1}$ of Li

V$_2$O$_5$+H$_2$SO$_4$=(VO$_2$)$_2$SO$_4$+H$_2$O Δh=−1715 kJ.kg$^{-1}$ of V$_2$O$_5$

2Al+3H$_2$SO$_4$=Al$_2$(SO$_4$)$_3$+3H$_2$ Δh=−18402 kJ.kg$^{-1}$ Al

However, for safety reasons especially for preventing thermal runaways, another dimensionless physical quantity must be introduced and calculated, it is the safety acid ratio, denoted $R_S$. It describes the ratio of the mass of acid that can absorb all the heat generated by the exothermic reaction wherein vanadyl, aluminium and lithium sulphate are formed without reaching the maximum allowed temperature to the mass of spent ECs. The safety acid ratio can be calculated using the following equation:

with $c_{Pacid}=x_{water} \cdot c_{pwater}+x_{H2SO4} \cdot c_{PH2SO4}$

Where $m_{acid}$ and $m_{EC}$ are the masses expressed in kg of acid and spent ECs respectively, $\Delta h_{reaction}$, the specific enthalpy of the dissolution reaction in J.kg$^{-1}$, $c_{PH2SO4}$, $c_{Pacid}$, $c_{Pwater}$ and $C_{PEC}$ are the specific heat capacities expressed in J.kg$^{-1}$.K$^{-1}$ of concentrated sulphuric acid, the sulphuric acid aqueous solution, water, and spent ECs respectively, and $T_{acid}$, $T_{ECs}$, and $T_{max}$, are temperatures expressed in kelvin of the acid, the spent ECs, and the maximum temperature allowed in the digestion process. For instance, values of neutralization and safety acid ratios are listed for several sulphuric acid concentrations based on the chemical composition of the ashes listed in Table 4.

TABLE 4

Neutralization, safety and operating acid ratios for spent ECs with several acid concentrations

|  | Concentrated sulphuric acid (98 wt %. H$_2$SO$_4$) | Battery grade sulphuric acid (30 wt %. H$_2$SO$_4$) | Diluted sulphuric acid (10 wt %. H$_2$SO$_4$) |
|---|---|---|---|
| Neutralization acid ratio ($R_N$) | 1.51 | 4.95 | 14.85 |
| Safety acid ratio ($R_S$) | 46.85 | 30.11 | 9.50 |
| Operating acid ratio ($R_O$) | 50.00 | 32.00 | 15 |

Therefore, for safety and economical concerns and due to the size of the reactor vessels sulphuric acid concentration of 30 wt %. H$_2$SO$_4$ was selected with a corresponding operating acid ratio of about 32, that is 32 kg of acid (26 dm$^3$) After completion of the exothermic dissolution, the operating temperature was maintained at 80° C. during 4 hours by heating the jacket. Due to explosion hazards related to hydrogen evolution, mixing was obtained with motor driven impeller by recirculating and heating the acid with a diaphragm pump and a plate heat exchanger made of Hastelloy®-C-276 (Alfa Laval). After complete dissolution of solids (i.e., Al$_2$O$_3$, Li$_2$O, V$_2$O$_5$) and completion of side reactions (i.e., hydrogen gas evolution, and heat generation), the bath acidity was adjusted to pH below 1 by adding concentrated sulphuric acid 98 wt %. Afterwards, about 50 grams of lithium chlorate, LiClO$_3$ or concentrated hydrogen peroxide H$_2$O$_2$ 30 % vol. was carefully added to the heated solution (80° C.) in order to oxidize all vanadium (IV) and (III) cations to pentavalent vanadium (V) species. Practically, the addition of the oxidizing chemical continue until the deep blue solution is totally converted to a yellow solution containing all vanadium as vanadyl (V) sulphate (VO$_2$)$_2$SO$_4$. Then the liquor is concentrated by evaporation to a molarity of vanadium (V) above 200 mol.m$^{-3}$ concentration which was determined by UV-Vis spectrophotometry. Once digestion and oxidation completed the solution was bottom pumped into a tank with a positive displacement pump such as PTFE diaphragm pump (George Fisher) and let cooled to ambient temperature. Then, the few remaining insoluble solids were removed by hydrocycloning or centrifugation and finally filtration using a filterpress equipment. Afterwards, lithium hydroxide solution or aqueous ammonia 28 wt % NH$_4$OH was added until reaching pH about 2 where flocculation of the hydrated red-brown precipitate of vanadium pentoxide (V$_2$O$_5$.25OH$_2$O) occurs. The gelatinous precipitate was separated by settling and filtration, carefully washed, dewatered, and dried at 200° C. In order to recover V$_2$O$_5$, the calcinate was fired at 700° C. during 2 hours in an Inconel®-617 crucible. The cooled black molten mass of pure V$_2$O$_5$ was then crushed and ground in a pebble mill with yttria stabilized zirconia balls of 10 mm to produce a fine red powder which passes a 200 Tyler mesh sieve. The final mass was 290 g with a purity of 98.5 wt %. V$_2$O$_5$. The oversize particles were recycled to the pebble mill. The previous filtrate was mixed with washing solutions and adjusted to pH about 2 by adding conc. H$_2$SO$_4$ 98 wt %. The traces of heavy metals (i.e., Cu$^{2+}$, Pb$^{2+}$ Sn$^{2+}$) were removed by common cathodic electrodeposition achieved onto a zirconium cathode under galvanostatic conditions with a constant cathodic current density of 200 A.m$^{-2}$ and using an expanded dimensionally stable anode for evolving oxygen in acidic media (i.e., DSA®-O$_2$) such as Ta/IrO$_2$ (30 g/m$^2$ IrO$_2$) (Magnetochemie B. V.). The electrolyzed solution was mixed with washing solutions and concentrated by evaporation in a kettle. Then, after cooling down the mother liquor to 20° C., lithium hydroxide solution or aqueous ammonia 28 wt % NH$_4$OH was added until reaching pH about 5 where flocculation of the gelatinous aluminium hydroxide (Al(OH)$_3$) occurred. The precipitate was then separated by settling and filtration. The washed, dewatered, dried precipitate was calcinated into a muffle furnace (Carbolite). The 204 grams obtained exhibited a purity of 98 wt %. The purified lithium sulphate liquor was mixed with washing solutions, concentrated by evaporation up to 650 kg/m$^3$ Li$_2$SO$_4$ measured by flame spectrophotometry and adjusted to pH=8 by, adding lithium hydroxide (LiOH), and warmed up to 100° C. Then bubbling carbon dioxide or adding ammonium carbonate (NH$_4$)$_2$CO$_3$ lithium carbonate Li$_2$CO$_3$ precipitated and was separated by filtration. The precipitate was washed and dried. The 518 grams of $Li_2CO_3$ obtained exhibited a purity of 97.5 wt %. The remaining liquor containing ammonium sulphate was discarded.

Example 3

Molten Salt Oxidation of ECs and Digestion of Salts

The first step consisted to render more brittle and easy to comminute a mass of one kilogram of spent electrochemical cells (ECs) having the chemical composition listed in Table 1. The electrochemical cells exhibited various states of charge. The hardening occurred by immersing the spent ECs directly into liquid argon maintained at 85 K. The dimensionless ratio, denoted $r_{AE}$, is the mass of liquid argon required per unit mass of ECs and it was calculated by the following equation listed below:

$$r_{AE} = \frac{m_{Ar}}{m_{EC}} = \frac{c_{PEC} \cdot (T_{EC} - T_F)}{c_{PAr} \cdot (T_F - T_{Ar})}$$

Where $m_{Ar}$ and $m_{EC}$ are the masses expressed in kg of liquid argon and spent ECs respectively, $c_{Par}$ and $c_{PEC}$ are the specific heat capacities expressed in $J.kg^{-1}.K^{-1}$ of liquid argon and spent ECs respectively, and $T_{Ar}$, $T_{EC}$, and $T_F$ are temperatures expressed in kelvin of liquid argon, spent ECs, and the final temperature allowed after immersion respectively. Using liquid argon at 85K and based on the following experimental parameters: (i) an average temperature $T_E$ around 260K of spent ECs which are stored in refrigerated warehouses, (ii) the specific heat capacities of liquid argon $c_{PAr}$ of 1058 $J.kg^{-1}.K^{-1}$ (Perry, R. H., and Green, D. W.—*Perry's Chemical Engineers' Handbook* $7^{th}$ ed.—McGraw-Hill, New York (1997) page 2–217) and $c_{PEC}$ of spent ECs of 1619 $J.kg^{-1}.K^{-1}$, and (iii) the final allowed temperature of the solid-liquid mixture maintained slightly below the boiling point of argon (87.65K) at 87 K, the practical ratio selected was about 134. That is 134 kg of liquid argon (ca. 95 $dm^3$) were used for 1 kg of ECs. In addition, owing to the lower density of spent ECs (1369 $kg.m^{-3}$) than the density of liquid argon at 85K (1407 $kg.m^{-3}$), the light spent ECs were introduced into the liquid argon using either a metallic screen basket or an expanded or a perforated metal box containing the said cell materials in order to prevent the hazardous flotation at the liquid-gas interface. Due to the issue of ductile-to-brittle transition at low temperature, face centered cubic (fcc) metals and alloys such as aluminium alloy 6061-T6 and austenitic stainless steel grade AISI 316L were preferred and selected for designing components and vessels. The residence time in the Dewar flask was about 30 minutes. Then more brittle, the hardened mass was directed to a shredder having knives blades made of tungsten carbide (Pulverisette 25, Fritsch GmbH). During the comminution operation, a continuous flow of liquid argon at 85 K circulates by gravity inside the shredding chamber maintaining sufficient hardness of the cell materials, and providing by evaporation an inert medium around the delaminated sheets. The final specific surface area of shredded cell materials forming delaminated pieces was measured equal to 1.5 $m^2.kg-1$ compared to the initial value of 0.3 $m^2.kg^{-1}$ with expected benefits for the reaction kinetics. The cuttings produced were smaller than about one millimeter. Oversize cuttings were removed with a stainless steel 316L wet vibrating screen with aperture of 12 Tyler meshes operated under a flow of liquid argon and directed to the cutting mill operation. Mass yield during comminution was about 98 wt %. The resulting cooled slurry (i.e., undersize delaminated cuttings and liquid argon) was directly collected with a perforated ladle and poured into a tall reaction vessel made of Inconel® 617 containing already the dry pellets of the pre-melted salts. The reactor is a 0.9144 meter tall vessel with an 304.8 mm outside diameter and wall and bottom thickness of 25.4 mm. The normal salt load is 10 kg of a binary mixture of potassium sulphate ($K_2SO_4$) and lithium sulphate ($Li_2SO_4$) having an eutectic composition. When completely loaded, the reactor and its cover flange were tightly bolted together using a pure annealed gold-platted copper O-ring and connected to an air compressor at 1.5 bars absolute pressure. Then, liquid and gaseous argon were gently removed by displacement while releasing a mass of cool shredded spent ECs inside the reactor with pre-melted salt pellets. The molten salt oxidation (MSO) was initiated by heating up the crucible into an electric heating oven made with a Fibrothal® module with Kanthal® Al heating elements. A flow of 20 (STP)$dm^3$/min compressed dry air was maintained until the completion of the reaction in order to facilitate the total combustion of all the carbonaceous materials (e.g., carbon black and copolymer). Two thermocouples B-type recorded both the inside and outer reactor surface temperature. After reaching 130° C., usually an exothermic and fast reaction occurs for few seconds with a peak temperature around 1500 K. Afterwards, the external heating was maintained constant to temperature about 1000 K during 6 hours. During combustion, the off-gases produced leaving the reaction vessel were collected and cooled by means of a miniature shell and tube heat exchanger made of stainless steel grade AISI 316L (Exergy Inc.) and were directed through a high efficiency particulate filter in order to remove entirely any entrained particulates (i.e., $Li_2O$, $Al_2O_3$, $V_2O_5$). Then the dust free gas is directed to a wet scrubber containing a spent slacked lime solution ($Ca(OH)_2$) for absorbing all the hazardous gaseous effluents (i.e., $CO_2$, HF, and $SO_2$). These gases reacted to form a sludge of harmless precipitates made of calcium carbonate ($CaCO_3$), calcium fluoride ($CaF_2$), and calcium sulphate ($CaSO_4$). The solid compounds were removed by settling and dried. Finally, the released gas passed through a small catalytic converter. After completion of the incineration steps, the solidified salt mass was demolded and discharged from the reactor and then crushed with a small jack hammer to small chunks. Solids were introduced with collected dust and particulates into the stirred digestion reactor.

The digestion reactor was made of a small jacketed glass-lined steel vessel with a capacity of 37.85 $dm^3$ (LBO series from Tycon®) with a large bottom discharge. The digestion reaction was initiated by adding a solution of diluted sulphuric acid at ambient temperature then heated to 80° C. For safety and economical concerns a sulphuric acid concentration of 10 wt %. $H_2SO_4$ was selected with an operating acid ratio of about 2, that is 20 kg of acid. After completion of the dissolution, the operating temperature was maintained at 80° C. during 1 hours by heating the jacket. Mixing was obtained with a PTFE-coated impeller (IKA). After complete dissolution of solids and completion of side reactions, the bath acidity was adjusted to pH below 1 by adding concentrated sulphuric acid 98 wt %. Afterwards, about 50 grams of lithium chlorate, $LiClO_3$ or concentrated hydrogen peroxide $H_2O_2$ 30% vol. was carefully added to the heated solution (80° C.) in order to oxidize all vanadium (IV) and (III) cations to pentavalent vanadium (V) species.

Practically, the addition of the oxidizing chemical continue until the deep blue solution is totally converted to a yellow solution containing all vanadium as vanadyl (V) sulphate $(VO_2)_2SO_4$. Then the liquor is concentrated by evaporation to a molarity of vanadium (V) above 200 mol.m$^{-3}$ concentration which was determined by UV-Vis spectrophotometry. Once digestion and oxidation completed the solution was bottom pumped into a tank with a positive displacement pump such as PTFE diaphragm pump (George Fisher) and let cooled to ambient temperature. Then, the few remaining insoluble solids were removed by hydrocycloning or centrifugation and finally filtration using a filterpress equipment. Afterwards, lithium hydroxide solution or aqueous ammonia 28 wt % $NH_4OH$ was added until reaching pH about 2 where flocculation of the hydrated red-brown precipitate of vanadium pentoxide ($V_2O_5.250H_2O$) occurs. The gelatinous precipitate was separated by settling and filtration, carefully washed, dewatered, and dried at 200° C. In order to recover $V_2O_5$, the calcinate was fired at 700° C. during 2 hours in an Inconel®-617 crucible. The cooled black molten mass of pure $V_2O_5$ was then crushed and ground in a pebble mill with yttria stabilized zirconia balls of 10 mm to produce a fine red powder which passes a 200 Tyler mesh sieve. The final mass was 293 g with a purity of 98.5 wt % $V_2O_5$. The oversize particles were recycled to the pebble mill. The previous filtrate was mixed with washing solutions and adjusted to pH about 2 by adding conc. $H_2SO_4$ 98 wt %. The traces of heavy metals (i.e., $Cu^{2+}$, $Pb^{2+}$ $Sn^{2+}$) were removed by common cathodic electrodeposition achieved onto a zirconium cathode under galvanostatic conditions with a constant cathodic current density of 200 A.m$^{-2}$ and using an expanded dimensionally stable anode for evolving oxygen in acidic media (i.e., DSA®-$O_2$) such as Ta/IrO$_2$ (30 g/m$^2$ IrO$_2$) (Magnetochemie B.V.). The electrolyzed solution was mixed with washing solutions and concentrated by evaporation in a kettle. Then, after cooling down the mother liquor to 20° C., lithium hydroxide solution or aqueous ammonia 28 wt % $NH_4OH$ was added until reaching pH about 5 where flocculation of the gelatinous aluminium hydroxide ($Al(OH)_3$) occurred. The precipitate was then separated by settling and filtration. The washed, dewatered, dried precipitate was calcinated into a muffle furnace (Carbolite). The 205 grams obtained exhibited a purity of 98 wt %. The purified lithium sulphate liquor was mixed with washing solutions, concentrated by evaporation up to 650 kg/m$^3$ $Li_2SO_4$ measured by flame spectrophotometry and adjusted to pH=8 by adding lithium hydroxide (LiOH), and warmed up to 100° C. Then bubbling carbon dioxide or adding ammonium carbonate $(NH_4)_2CO_3$ lithium carbonate $Li_2CO_3$ precipitated and was separated by filtration. The precipitate was washed and dried. The 520 grams of $Li_2CO_3$ obtained exhibited a purity of 98 wt %. The remaining liquor containing ammonium sulphate was discarded. It must be understood that the invention is in no way limited to the above embodiments and that many changes may be brought about therein without departing from the scope of the invention as defined by the appended claims.

The invention claimed is:

1. A method of recovering and recycling lithium and vanadium compounds from a material comprising spent lithium metal gel and solid polymer electrolyte rechargeable batteries, and/or scraps therefrom and/or products used to produce said batteries, which comprises providing a mass of said material, hardening said mass by cooling at a temperature below room temperature, comminuting said mass of cooled and hardened material, treating said comminuted mass with an acid to give an acidic mother liquor, extracting vanadium compounds from said mother liquor, separating heavy metals and aluminium therefrom and precipitating lithium carbonate from remaining solution.

2. Method according to claim 1, which comprises comminuting said mass of hardened material under a flow of cryogenic liquefied gases.

3. Method according to claim 2, wherein said mass of material is hardened by cooling it to a temperature between 0 K and 298 K.

4. Method according to claim 3, wherein said mass of material is cooled to between 77 K and 273 K.

5. Method according to claim 4, wherein said mass of material is cooled to 85 K.

6. Method according to claim 1 or 2, which comprises batch incinerating said comminuted hardened cooled mass, and treating said comminuted hardened cooled mass to give said mother liquor.

7. Method according to claim 4, which comprises cooling said comminuted hardened cooled mass and scrubbing of gases produced thereby before treating same to give said mother liquor.

8. Method according to claim 6, wherein said liquor is obtained by digesting ashes and solid residues obtained by batch incinerating said comminuted hardened cooled mass in an acid.

9. Method according to claim 8, wherein said acid is selected from the group consisting of inorganic or organic acids.

10. Method according to claim 9 wherein said acid is selected from the group consisting of HF, HCl, HBr, HI, $HNO_3$, $H_3PO_4$, $H_2SO_4$, $HClO_4$, HCOOH, $CF_3SO_3H$, or mixtures thereof.

11. Method according to claim 10, wherein said acid is sulphuric acid ($H_2SO_4$).

12. Method according to claim 1, wherein said comminuted mass is obtained by cryogenic comminution.

13. Method according to claim 1, wherein said mother liquor is obtained by digesting the comminuted hardened cooled mass in an acid, and separating a mixture of inert gas and hydrogen to give said mother liquor.

14. Method according to claim 13, wherein said acid is selected from the group consisting of inorganic or organic acids.

15. Method according to claim 14, wherein said acid is selected from the group consisting of HF, HCl, HBr, HI, $HNO_3$, $H_3PO_4$, $H_2SO_4$, $HClO_4$, HCOOH, $CF_3SO_3H$, or mixtures thereof.

16. Method according to claim 15, wherein said acid is sulphuric acid $H_2SO_4$.

17. Method according to claim 1, which comprises heating said comminuted hardened cooled mass under conditions and at a temperature effective to cause batch oxidation in a molten salt bath of said comminuted material and removing gases produced during said oxidation, before treating said cooled mass to give said mother liquor.

18. Method according to claim 17, wherein said oxidation is carried out by oxidizing and/or burning the comminuted hardened cooled mass in a molten salt bath comprising a mixture of molten alkali and alkali-earth metal inorganic salts, at a temperature effective to cause destruction of the comminuted material.

19. Method according to claim 18, wherein said inorganic salts are selected from the group consisting of $M_nX_m$ wherein M=Li, Na, K, Rb, Cs, Be, Mg, Ca, Sr, Ba and X=F$^-$, Cl$^-$, Br$^-$, I$^-$, $SO_4^{2-}$, $NO_3^-$, $CO_3^{2-}$, $BO_3^{2-}$, $PO_4^{3-}$.

20. Method according to claim 17, wherein said temperature is between 500 K and 2000 K.

21. Method according to claim 18, wherein said temperature is between 700 K and 1500 K.

22. Method according to claim 20, wherein said temperature is 1000 K.

23. Method according to claim 17, which comprises digesting the comminuted, hardened cooled mass from which said gases produced during said oxidation have been removed, in an acid, said mother liquor containing insoluble solids.

24. Method according to claim 23, wherein said acid is selected from the group consisting of HF, HCl, HBr, HI, $HNO_3$, $H_3PO_4$, $H_2SO_4$, $HClO_4$, HCOOH, $CF_3SO_3H$, or mixtures thereof.

25. Method according to claim 24, wherein said acid is sulphuric acid, $H_2SO_4$.

26. Method according to claim 8, wherein said mother liquor is treated to oxidize substantially entirely all vanadium (III) and (IV) cations to pentavalent vanadium (V).

27. A method of recovering and recycling lithium and transitional metal compounds from a material comprising spent lithium metal gel or solid polymer electrolyte rechargeable batteries, and/or scraps therefrom and/or products used to produce said batteries, said method comprising the steps of:
providing a mass of said material;
neutralizing said mass by cooling at a temperature below room temperature;
comminuting said mass of cooled material;
treating the comminuted mass with an acid to give an acidic mother liquor;
extracting transitional metal compounds from said acidic mother liquor;
separating aluminium from said acidic mother liquor and precipitating lithium carbonate from remaining solution.

28. A method as defined in claim 27, wherein said transitional metal compounds is selected from a group consisting of phosphorus, iron, vanadium, manganese, nickel, titanium and cobalt.

29. A method as defined in claim 27, wherein mass of said material is cooled below 273 K.

30. A method as defined in claim 29, wherein mass of said material is cooled below 243 K.

31. A method as defined in claim 27, further comprising the step of incinerating the comminuted mass of cooled material prior to treating said comminuted mass with an acid.

32. A method as defined in claim 31, further comprising the step of wet scrubbing of off-gases produced during the incineration step.

33. A method as defined in claim 32, wherein off-gases produced during the incineration step are filtered to remove entrained particulates.

34. A method as defined in claim 31, wherein ashes and solid residues of incineration are digested by reacting with an organic or inorganic acid.

35. A method as defined in claim 27, further comprising the step of removing insoluble solid by-products by hydrocycloning or centrifugation and retaining soluble by-products to obtain said acidic mother liquor.

36. A method as defined in claim 35, further comprising the step of adding an oxidizing chemical to said acidic mother liquor to obtain a transitional metal sulphate.

37. A method as defined in claim 27, further comprising the step of removing heavy metals from said acidic mother liquor.

38. A method as defined in claim 35, wherein said lithium carbonate is obtained by washing said remaining solution and adding lithium hydroxide to adjust said remaining solution to a pH of about 8, warming up said remaining solution, and adding carbon dioxide or ammonium carbonate to precipitate lithium carbonate which is separated by filtration.

* * * * *